United States Patent
Morigami

[19]

[11] Patent Number: 6,057,934
[45] Date of Patent: May 2, 2000

[54] METHOD AND APPARATUS OF CORRECTING IMAGE DATA LEVELS

[75] Inventor: Masanori Morigami, Nara, Japan

[73] Assignee: Sharp Kabushiki Kaisha, Osaka, Japan

[21] Appl. No.: 08/962,239

[22] Filed: Oct. 31, 1997

[30] Foreign Application Priority Data

Nov. 1, 1996 [JP] Japan ................................ 8-291897

[51] Int. Cl.$^7$ ................................................. H04N 5/202
[52] U.S. Cl. ........................................... 358/1.9; 382/173
[58] Field of Search ........................... 395/109; 382/173, 382/169–172, 227; 358/1.9

[56] References Cited

U.S. PATENT DOCUMENTS

| | | | |
|---|---|---|---|
| 5,473,373 | 12/1995 | Hwung et al. | 348/254 |
| 5,557,533 | 9/1996 | Koford et al. | 364/491 |

FOREIGN PATENT DOCUMENTS

| | | |
|---|---|---|
| 0561287 | 9/1992 | European Pat. Off. . |
| 0599099 | 6/1994 | European Pat. Off. . |
| 308532 | 11/1993 | Japan . |
| WO9015501 | 12/1990 | WIPO . |

*Primary Examiner*—Thomas D Lee
*Assistant Examiner*—Stephen Brinich

[57] ABSTRACT

More than one (for example, $2^3=8$) interpolation area is set for data x. Output image data Y at the start end x(i) of each interpolation area is expressed using a proportional component X of the data x and an offset component Y(i) from the proportional component X. Input data positioned in the interpolation area, at a location other than the start end, is computed as $Y=X+Y(i)+\Delta Y$, where $\Delta Y$ is a variation of the offset component Y(i) corresponding to a distance $\Delta x$ from the start end x(i) to the input data. Since an interpolation data register only has to store the offset components Y(i), Y(i+1), ..., the number of levels can be increased while a capacity of the interpolation data register remains substantially the same. Consequently, it is possible to increase the number of levels in a level correcting circuit for generating output image data through γ correction, while maintaining the circuit size.

16 Claims, 8 Drawing Sheets

METHOD AND APPARATUS OF CORRECTING IMAGE DATA LEVELS

FIELD OF THE INVENTION

The present invention relates to method and apparatus of effecting so-called γ correction to correct a half-tone image as realistic as possible, which can be suitably applied to an image data input/output device, such as a facsimile machine.

BACKGROUND OF THE INVENTION

An image data handling apparatus, such as a facsimile machine, effects lower area highlighting, in which image data are highlighted more in an area where a density of an image is lower (or the image gets darker) as shown in FIG. 8, so that input image data are corrected in a more realistic manner as previously mentioned.

A typical level correcting technique in the prior art uses a memory as is disclosed in, for example, Japanese Laid-Open Patent Application No. 308532/1993 (Tokukaihei 5-308532). To be more specific, let an address of input image data be x, and let the output image data from the address x be Y, then non-linear characteristics as shown in FIG. 8 is are given to the data stored in the memory.

Accordingly, as shown in FIG. 9, the output data are shifted with respect to a memory address, and as set forth in Table 1 below, the data take a value shifted to a higher order with respect to an input address. Thus, even when the output image data have non-linear characteristics with respect to the input image data, the output data from the memory can be used as corrected data by pre-storing the output image data at a memory address for the input image data x.

TABLE 1

| ADDRESS | 0 | 1 | 2  | 3  | ... | 253 | 254 | 255 |
|---------|---|---|----|----|-----|-----|-----|-----|
| DATA    | 4 | 8 | 12 | 16 | ... | 252 | 252 | 252 |

In above-mentioned Japanese Laid-Open Patent Application No. 308532/1993, when an image having both a picture area and a text area is formed, an original is read to compute a density distribution first. Thereafter, a γ table made of corrected value data in accordance with the density distribution is created, after which the original is read again to output a formed image.

However, since the number of levels and a memory capacity are directly proportional, the above conventional technique has a problem that a memory capacity increases significantly if the number of the levels increases.

For example, in the case of $2^6$=64-level correction, where each pixel is corrected with 6-bit accuracy when a unit image data is 6-bit long, a memory capacity of $6 \times (2^{6-1})$=378 bits is necessary.

If each memory element is made of a gate array, each flip-flop demands seven NAND gates in NAND conversion generally, and in total, as many as 378×7=2646 gates are necessary.

Thus, the prior art has a problem in that a circuit is upsized considerably if the number of levels increases.

SUMMARY OF THE INVENTION

It is therefore an object of the present invention to provide method and apparatus of correcting image data levels by increasing the number of levels while maintaining the circuit size substantially the same.

A method of correcting image data level of the present invention is a method of generating output image data by effecting predetermined level correction to input image data, and to fulfil the above object, the present method comprises:

a storing step of computing offset components from the proportional component which is linearly proportional to the input image data, for example, at a ratio of 1:1, and storing the same in advance;

an offset component obtaining step of computing a first offset component corresponding to the input image data out of the offset components stored in the storing step; and a computing step of computing the output image data by adding the first offset component and the proportional component of the input image data.

In the case of correcting the image data levels, the domain of values of the offset components with respect to the domain of variability of the input image data is narrow compared with the domain of values of the output image data per se. Thus, storing the offset components in the storing step can reduce a memory capacity necessary for the data used in correction as compared with a case of storing the output image data per se. Consequently, it has become possible to increase the number of levels of the input and output image data while maintaining the size of a circuit, such as a memory.

To further reduce the memory capacity, it is preferable to carry out the above steps in the manner described below. That is, in the storing step, the data area of the input image data is divided into a plurality of interpolation areas, and the offset component at the start end of each interpolation area is stored in advance. In the offset component obtaining step, a second offset component at the start end of a first interpolation area to which the input image data belong, and a third offset component at the start end of the next adjacent interpolation area are retrieved from the offset components stored in the storing step. In the computing step, the first offset component (Y0) is computed in accordance with the following equation:

$$Y0=(\Delta Y/N \times \Delta x)+Y(i)$$

where N is a width across the first interpolation area, ΔY is a balance between the second and third offset components, Δx is a distance from the start end of the first interpolation area to the input image data, and Y(i) is the second offset component.

According to the above arrangement, the first offset component corresponding to the input image data is computed out of the second and third offset components. Thus, it is no longer necessary to store the offset component for each piece of input image data, and the output image can be computed by storing the offset component at the start end of each interpolation area alone. Consequently, the memory capacity required in the storing step can be reduced further. Hence, it has become possible to increase the number of levels of the input and output image data while maintaining the size of a circuit, such as a memory.

To realize an apparatus of correcting image data levels carrying out each of the above steps, it is preferable to compute ΔY×Δx first when computing Y0, for example, Y0=(ΔY×Δx)/N, to reduce a rounding error.

For a fuller understanding of the nature and advantages of the invention, reference should be made to the ensuing detailed description taken in conjunction with the accompanying drawings.

DESCRIPTION OF THE EMBODIMENTS

Figure 1:
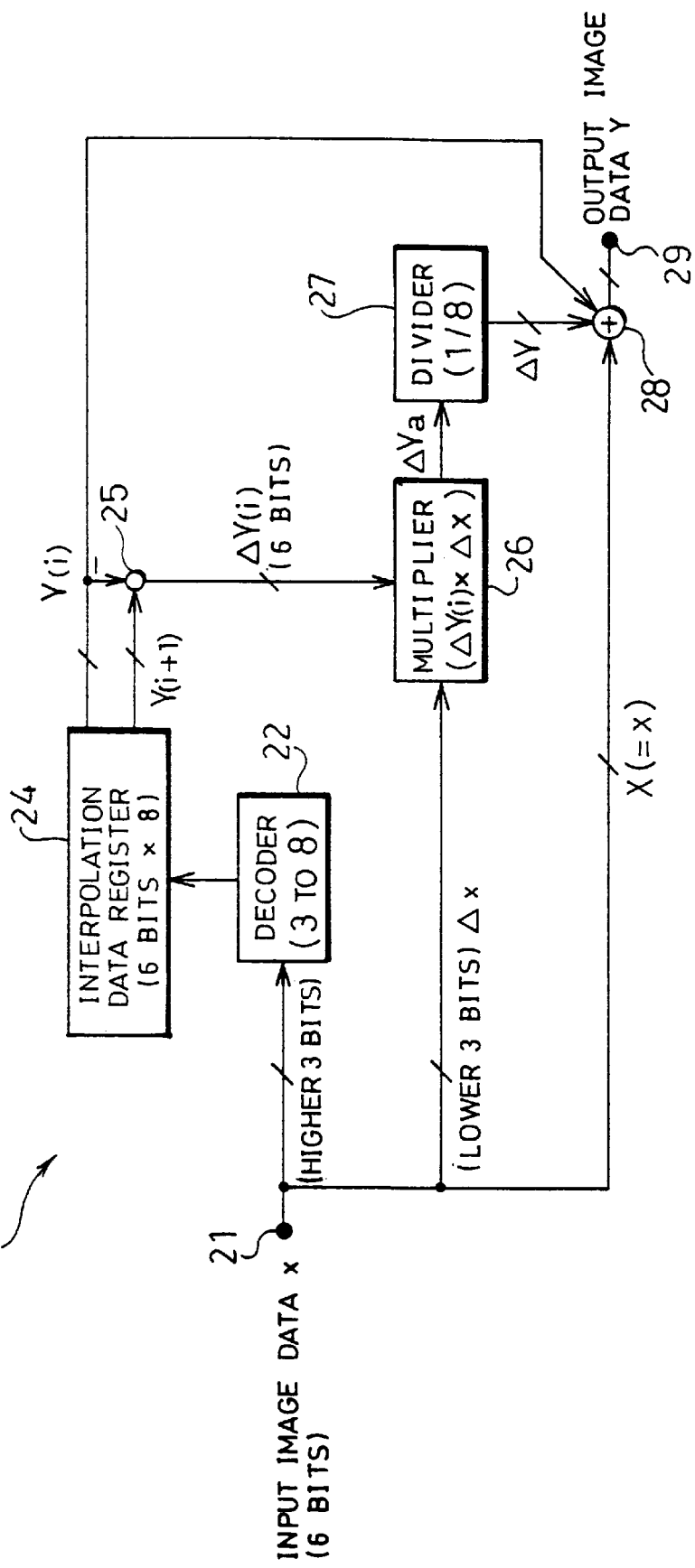
FIG. 1 is a block diagram depicting an electric arrangement of a level correcting circuit in accordance with an example embodiment of the present invention.

An idea underlying a level correction method adopted in an example embodiment of the present invention will be explained prior to the description of the example embodiment. The adopted method is a method of generating output image data Y by effecting predetermined level correction to input image data x, wherein:

a data area of the input image data x is divided into a plurality of interpolation areas in advance;

an offset component Y(i) from a proportional component X (which is linearly proportional to the input image data x) at the start end x(i) of each interpolation area is computed and stored in advance;

the offset component Y(i) at the start end x(i) of the interpolation area to which the input image data x belong and an offset component Y(i+1) at the start end x(i+1) in the next adjacent interpolation area are retrieved to find a gradient α, which is a balance from a gradient of the proportional component X;

a variation ΔY between the input image data x to the start end x(i) of the interpolation area, to which the input image data x belong, is computed using a distance Δx from the start end x(i) of the interpolation area, to which the input image data x belong, to the input image data x and the gradient α; and the output image data Y are generated by adding the offset component Y(i) and a variation ΔY to the proportional component X of the input image data x.

According to the above arrangement, the offset component Y(i), or a balance between the output image data Y and the proportional component X proportional to the input image data x at a specific coefficient, for example, 1:1, is computed at the start end x (i) of each interpolation area based on the proportional component X and stored in advance. In other words, the output image data Y at the start end x(i) can be expressed as:

$$Y = X(i) + Y(i) \quad (1).$$

On the other hand, in case of an intermediate value in each interpolation area, the proportional component X can be computed by multiplying the input imaged data x by the specific coefficient, but the offset component Y0 can not be computed without an interpolation computation. Broadly speaking, the interpolation computation can be carried out by approximating the output image data Y to a straight line linking the start ends x(i), x(i+1), . . . of the interpolation areas.

In other words, the distance Δx from the start end x(i) to the actual input image data x is computed by:

$$\Delta x = x - x(i) \quad (2).$$

On the other hand, the gradient α, or a balance between the gradient of the above straight line and proportional component X using the offset component Y(i+1) at the start end x(i+1) of the next adjacent interpolation area, is computed by:

$$\alpha = \{Y(i+1) - Y(i)\} / \{x(i+1) - x(i)\} \quad (3).$$

Then, the variation ΔY is computed using the distance Δx and gradient α:

$$\Delta Y = \alpha \times \Delta x \quad (4).$$

The offset component Y0, which approximates to the intermediate value linearly, can be computed by adding the variation ΔY and offset component Y(i). Further, the output image data Y are generated by adding the offset component Y0 thus computed and the proportional component X.

Thus, the output image data Y can be expressed as below using Equations 1 through 4 above:

$$\begin{aligned} Y &= X + Y0 \quad (5) \\ &= X + \{Y(i) + \Delta Y\} \\ &= X + \{Y(i) + \alpha \times \Delta x\} \\ &= X + Y(i) + \frac{Y(i+1) - Y(i)}{x(i+1) - x(i)} \{x - x(i)\}. \end{aligned}$$

Note that, however, when the specific coefficient is 1, X=x in above Equation. In this case, a multiplier for computing the proportional component X out of the input imaged data x can be omitted, thereby making it possible to simplify the arrangement compared with a case using a specific coefficient other than 1.

As has been explained, the output image data Y are computed not by using Y=0 as a reference value, but by computing the proportional component X as the reference value and generating the offset component Y0=Y-X at the start end x(i) of each interpolation area as the components Y(i), Y(i+1), . . . from a conversion table using the memory. Consequently, it has become possible to increase the number of levels while maintaining the size of a circuit, such as a memory.

Also, an apparatus for correcting image data levels to perform the above level correcting method is an apparatus for generating the output image data Y by effecting predetermined level correction to the input image data x, and the apparatus includes:

an interpolation data register for storing, in advance, the offset component Y(i) from the proportional component X, which is linearly proportional to the input image data, at the start end x(i) of each of interpolation areas obtained by dividing a data area of the input image data;

a first decoder for retrieving the offset component Y(i) at the start end x(i) of the interpolation area to which the input imaged data x belong and the offset component Y(i+1) at the start end x(i+1) of the next adjacent interpolation area from the interpolation data register;

a subtractor for computing a balance between the offset components Y(i+1) and Y(i) outputted from the interpolation data register;

a second decoder for computing the distance $\Delta x$ from the start end x(i) of the interpolation area, to which the input image data x belong, to the input imaged data x;

a divider for computing the gradient $\alpha$, which is a balance from a gradient of the proportional component X, by dividing the balance by a distance between the start ends x(i+1) and x(i);

a multiplier for computing the variation $\Delta Y$ by multiplying the gradient $\alpha$ by the distance $\Delta x$; and an adder for generating the output image data Y by adding the offset component Y(i) and variation $\Delta Y$ to the proportional component X of the input image data x.

According to the above arrangement, the first decoder judges to which interpolation area the input image data x belong using the higher bits of the input image data x. Then, the first decoder retrieves the offset component Y(i) at the start end x(i) of the judged interpolation area and the offset component Y(i+1) at the start end x(i+1) of the next adjacent interpolation area from the interpolation data register.

The two offset components Y(i+1) and Y(i) are inputted into the subtractor, which accordingly computes a balance, Y(i+1)−Y(i). Here, the distance x(i+1)−x(i), which is a distance from the start end x(i) to the start end x(i+1), is computed in advance. Thus, the divider divides the output Y(i+1)−Y(i) from the subtractor by the distance x(i+1)−x(i), whereby the gradient $\alpha$ is found in accordance with Equation (3) above.

On the other hand, the data of the lower bits of the actual input image data x are inputted into the second decoder, which computes the distance $\Delta x$ from the start end x(i) of the interpolation area, to which the actual input imaged data x belong, to the actual input image data x in accordance with Equation (2) above. Then, the multiplier computes the variation $\Delta Y$ by multiplying the gradient $\alpha$ computed by the divider by the distance $\Delta x$ computed by the second decoder in accordance with Equation (4) above.

Finally, the adder adds the offset component Y(i) and variation $\Delta Y$ thus found to the proportional component X of the input imaged data x.

Next, an example embodiment of the present invention will be explained in detail with reference to FIGS. 1 through 7 in the following.

Figure 2:
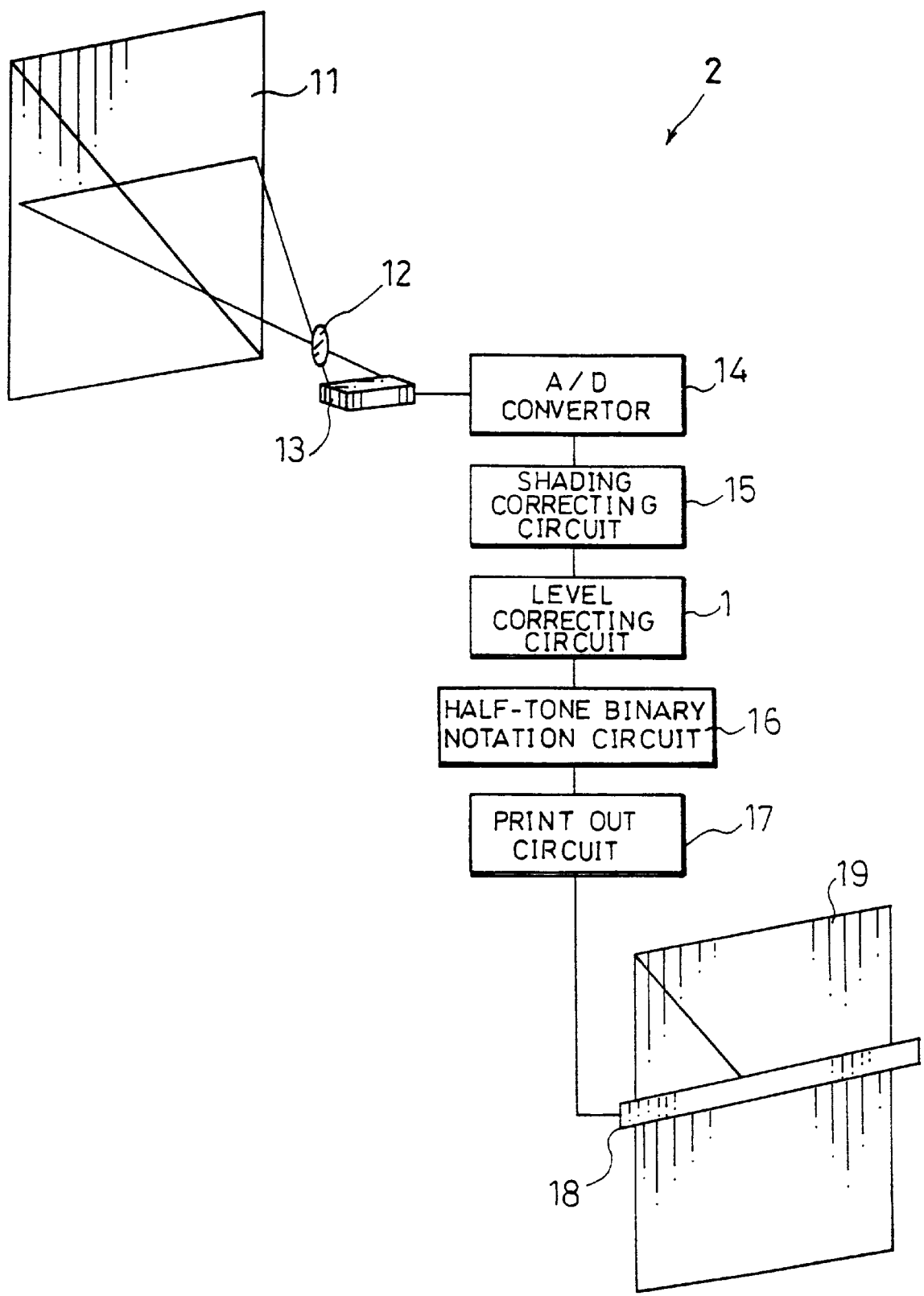
FIG. 2 is a block diagram depicting an image copying machine adopting the level correcting circuit of FIG. 1.

FIG. 1 is a block diagram depicting an electrical arrangement of a level correcting circuit 1 in accordance with the example embodiment of the present invention. FIG. 2 is a block diagram depicting an arrangement of an image copying machine 2 adopting the level correcting circuit 1.

The image copying machine 2 reads an optical image of an original document 11 by means of an image sensor 13, which is realized by a charge-coupled device or the like, through a lens 12. An output analog signal from the image sensor 13 is converted into digital data by an Analog-to-Digital (A/D) convertor 14, and the resulting digital data are inputted into the level correcting circuit 1 through a shading correcting circuit 15. Then, a half-tone binary notification circuit 16 discriminates the image data corrected by the level correcting circuit 1 into binary data, which represent whether each dot in the output image is white or black, and the resulting binary data are inputted into a print output circuit 17. The print output circuit 17 drives a thermal head 18 in accordance with the binary data, whereby a copy image of the original document 11 is formed on a recording sheet 19.

If a transmission signal line and an encoding/decoding circuit are provided between the half-tone binary notification circuit 16 and print out circuit 17, a facsimile machine can be realized.

Figure 3:
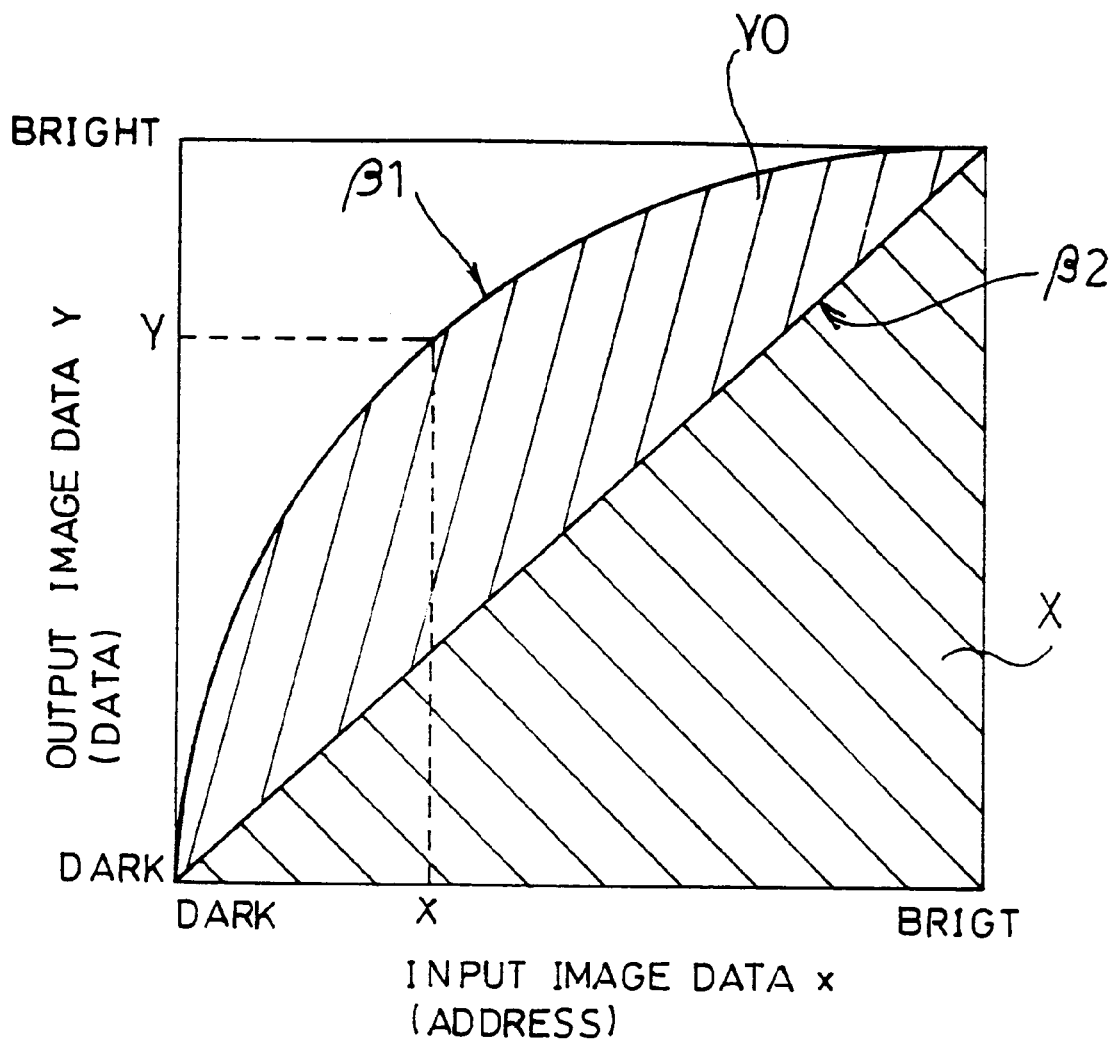
FIG. 3 is a graph explaining an idea of a level correcting method underlying the present invention.

FIG. 3 is a graph explaining a basic idea of the level correcting method of the present invention. In the drawing, as is indicated by $\beta 1$, the darker the input image data x, the more the output image data Y are highlighted, which is known as the lower area highlighting. To do so, the level correcting data indicated by $\beta 1$ are divided into the proportional component X, or a portion below a straight line indicated by $\beta 2$, and the offset component Y0, or a portion above the straight line indicated by $\beta 2$, and a memory is used for a partial calculation of the offset component Y.

Figure 4:
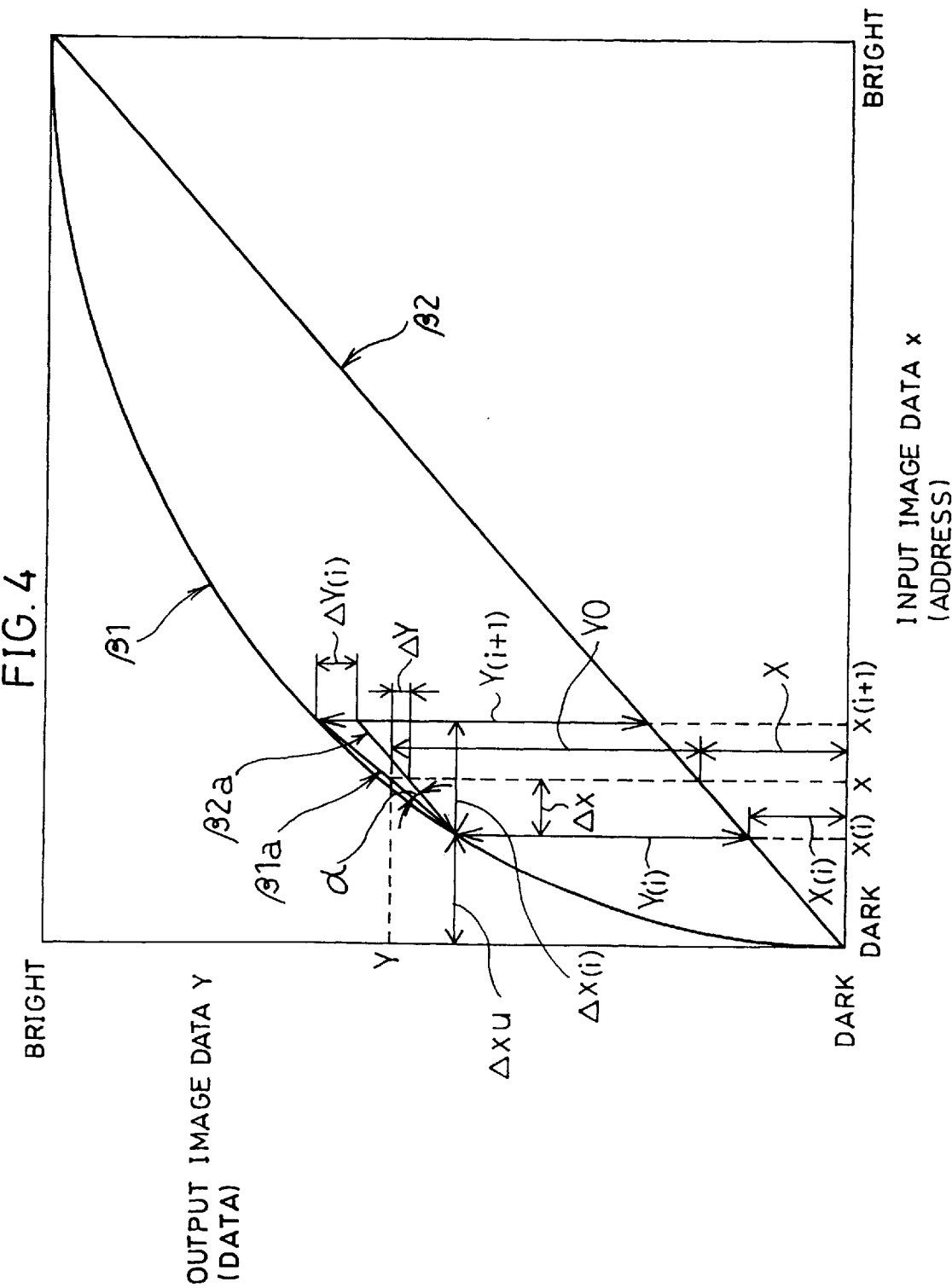
FIG. 4 is a graph explaining the level correcting method of the present invention in detail.

To be more specific, as shown in FIG. 4, the data area of the input image data x, or a varying area from dark to bright, is divided into interpolation areas at predetermined intervals $\Delta xu$. To begin with, the offset component Y(i) from the proportional component X(i) of the output image data Y at the start end x(i) of the interpolation area $\Delta x(i)$, to which the input imaged data x belong, is computed. Also, the offset component Y(i+1) at the start end x(i+1) of another interpolation area, which keeps the interval $\Delta xu$ from the start end x(i), is computed in the same manner.

Then, a balance $\Delta Y(i)$ between the two offset components Y(i+1) and Y(i) is computed. In FIG. 4, a straight line indicated by $\beta 2a$ representing the balance $\Delta Y(i)$ is parallel to the straight line indicated by $\beta 2$ representing the proportional component X.

In contrast, another straight line indicated by $\beta 1a$ representing the balance $\Delta Y(i)$ is an approximation of a curve indicated by $\beta 1$. The gradient $\alpha$ is a balance between the gradients of these two straight lines. Thus, a value found by multiplying the distance $\Delta x$ found in accordance with Equation (2) above by the gradient $\alpha$ in accordance with Equation (4) above is a balance between the two straight lines respectively indicated by $\beta 1a$ and $\beta 2a$, or the variation $\Delta Y$ with respect to the actual input image data x. Then, the output image data Y corresponding to the input image data x can be obtained through an interpolation operation by adding the variation $\Delta Y$ and offset component Y(i) to the proportional component X in accordance with Equation (5) above.

More detailed explanation will be given with reference to FIG. 1. Here, for example, 6-bit input image data x are supplied to an input terminal 21 from the shading correcting circuit 15. Then, the higher 3 bits are inputted into a decoder 22 serving as the first decoder, while the lower 3 bits are inputted into a multiplier 26. Thus, in this case, the data area is divided into $2^3=8$ interpolation areas. Then, the decoder 22 judges to which interpolation area out of the 8 interpolation areas the input imaged data x belong, and outputs the judging result to an interpolation data resistor 24.

The interpolation data register 24 stores each of the offset components Y(i), Y(i+1), . . . respectively at the start end x(i), x(i+1), . . . of the 8 interpolation areas in the form of 6-bit data. The interpolation data register 24 outputs the offset component Y(i) at the start end x(i) of the interpolation area, to which the input image data x belong, and the offset component Y(i+1) at the start end x(i+1) of the next adjacent interpolation area to a subtractor 25. Accordingly, the subtractor 25 outputs the balance $\Delta Y(i)$ between the offset components Y(i+1) and Y(i) in the form of 6-bit data to the multiplier 26.

In the normal $\gamma$ correction, if the input image data x are 0 or 1, the offset component computed in the above manner is 0. Thus, in the present embodiment, when the offset component Y(0) at the start end of the initial interpolation area is used, the offset component Y(0) is not retrieved from the interpolation data register 24, but from a circuit that outputs 0 data. The circuit such that outputs 0 data can be realized with far fewer gates compared with a register by connecting the output to the ground level. Accordingly, the number of the registers of the interpolation data register 24 can be matched with the number of the interpolation areas, thereby downsizing the gate of the entire level correcting apparatus. For comparison, in the γ correction, if a value of the output image data Y when the input image data x are the 0 data, or the intercept, is stored to further highlight the lower area, the registers of the interpolation data registers 24 outnumbers the interpolation areas by one.

The lower 3 bits of the input image data x inputted into the multiplier 26 are used as the distance Δx from the start end x(i) of the interpolation area to the input image data x. If the numbers of bits of the lower data of the input imaged data x and the data of the distance Δx do not match, the second decoder may be provided in the preceding stage of the multiplier 26. The multiplier 26 multiplies the balance ΔY(i) by the distance Δx which is in effect the lower bits of the input image data x. In this manner, the multiplier 26 outputs a variation ΔYa in the form of 9-bit data.

Then, a divider 27 divides data of the variation ΔYa by $\frac{1}{8}(=\frac{1}{2^3})$, which is a value corresponding to the interval Δxu, whereby the variation ΔY from the start end x(i) is found. An adder 28 adds the output from the divider 27 and the offset component Y(i) from the interpolation data register 24 to the proportional component X(=x) of the full-bit input image data x from the input terminal 21, thereby outputting the result as the output image data Y from an output terminal 29.

To further describe the circuit downsizing effect realized by the level correcting apparatus of the present embodiment, the circuit size of a conventional level correcting apparatus and the circuit size of the level correcting apparatus of FIG. 1 are compared in a case where both the input image data and output image data are B-bit long.

In the following, the evaluation is carried out in two methods a and b: the number A of the interpolation areas is 64 in the former and 8 in the latter. The circuit sizes are compared by the number of gates (gate size) assuming that each level correcting apparatus is composed of a gate array. Further, the gate sizes of both the level correcting apparatuses are compared on the assumption that the gate size of each circuit forming the level correcting apparatuses are set as follows:

| circuit | necessary number of gates |
| --- | --- |
| for a memory to store 1-bit data | 7 |
| for subtractor per bit | 12 |
| for adder per bit | 25 |
| for multiplier & divider which compute ΔY(i) × Δx/N | A × 14 + B × 33 where A is the number of interpolation areas and B is the number of output bits |
| for decoder which selects interpolation area of input image data | 28 per interpolation area |

Note that the above number of gates are sample values extracted by an LSI circuit.

Evaluation results of the conventional level correcting apparatus and the level correcting apparatus adopting the method a and b based on the above evaluation method are set forth in Table 2 below and FIG. 5. The content set forth in Table 2 is graphed in FIG. 5, which shows a variation in the circuit size of the level correcting apparatus adopting the methods a and b assuming that the number of gates of the conventional level correcting apparatus is 100, and a variation of the size of the circuit adopting the method b with respect to the size of the circuit adopting the method a.

TABLE 2

| BITS | GATES IN PRIOR ART | METHOD a GATES | METHOD a EFFI-CIENCY | METHOD b GATES | METHOD b EFFI-CIENCY | COM-PARISON OF METHODS a & b |
| --- | --- | --- | --- | --- | --- | --- |
| 4 | 448 | 3192 | 713% | 840 | 188% | 26% |
| 5 | 1120 | 3318 | 296% | 966 | 86% | 29% |
| 6 | 2688 | 3444 | 128% | 1092 | 41% | 32% |
| 7 | 6272 | 3570 | 57% | 1218 | 19% | 34% |
| 8 | 14336 | 3696 | 26% | 1344 | 9% | 36% |
| 9 | 32256 | 3822 | 12% | 1470 | 5% | 38% |
| 10 | 71680 | 3948 | 6% | 1596 | 2% | 40% |

The prior art referred in Table 2 above is a case where all the possible combinations of the input image data and output image data area stored in the memory area. In this case, the circuit size to realize the above memory area in terms of the number of gates is expressed as:

$$2^B \times B \times 7 \tag{6}$$

In contrast, in case of the arrangement of FIG. 1, the breakdown of the necessary gate number for the level correcting apparatus is:

for interpolation data register 24: B×A×7 for decoder 22 and subtractor 25: A×28+B×12 for multiplier 26 and divider 27: A×14+B×33 for adder 28: B×25.

Thus, the necessary gate number for the level correcting apparatus is expressed as:

$$7 \times A \times B + (12+33+25) \times B + (14+28) \times A \tag{7}$$

Therefore, in case of the level correcting apparatus adopting the method a, the gate size is 518B+2688, and in case of the level correcting apparatus adopting the method b, the gate size is 126B+336.

In Table 2 above, the efficiencies, of both the methods a and b are computed based on the gate size of the conventional level correcting apparatus, Also, in Table 2 above, the comparison of the methods a and b represents a ratio of the gate size of the method b with respect to the gate size of the method a.

Figure 5:
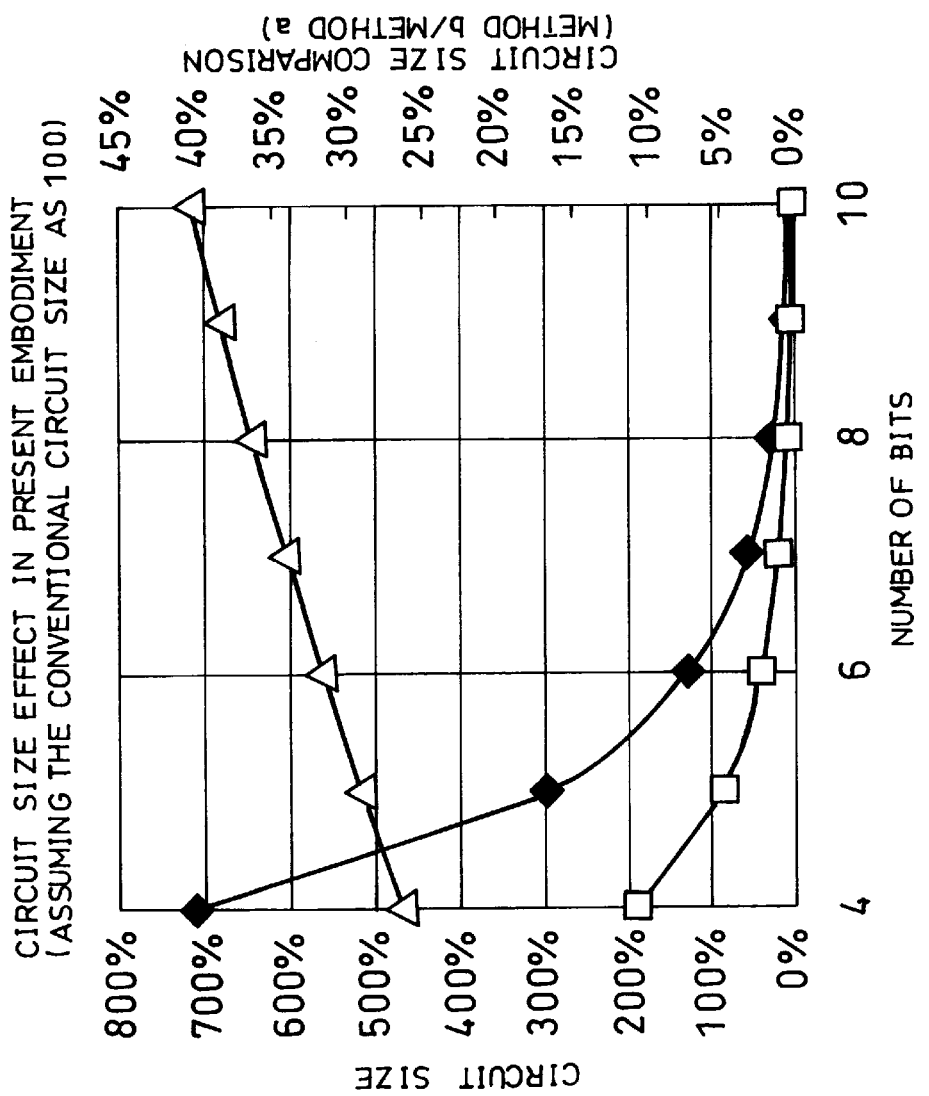
FIG. 5 is a graph showing the circuit downsizing effect realized by the level correcting circuit.

As is apparent from Equations (6) and (7) and Table 2 above, and FIG. 5, the level correcting apparatus adopting the method a is smaller than the conventional level correcting apparatus when the number B of bits is 7 or greater, while the level correcting apparatus adopting the method b is smaller than the conventional level correcting apparatus when the number B of bits is 5 or greater. Since the conventional level correcting apparatus becomes larger remarkably as the number B of bits increases, the efficiency of the circuit size of the level correcting apparatus (adopting the method a or b) of the present invention improves significantly as the number B of bits increases.

Figure 6:
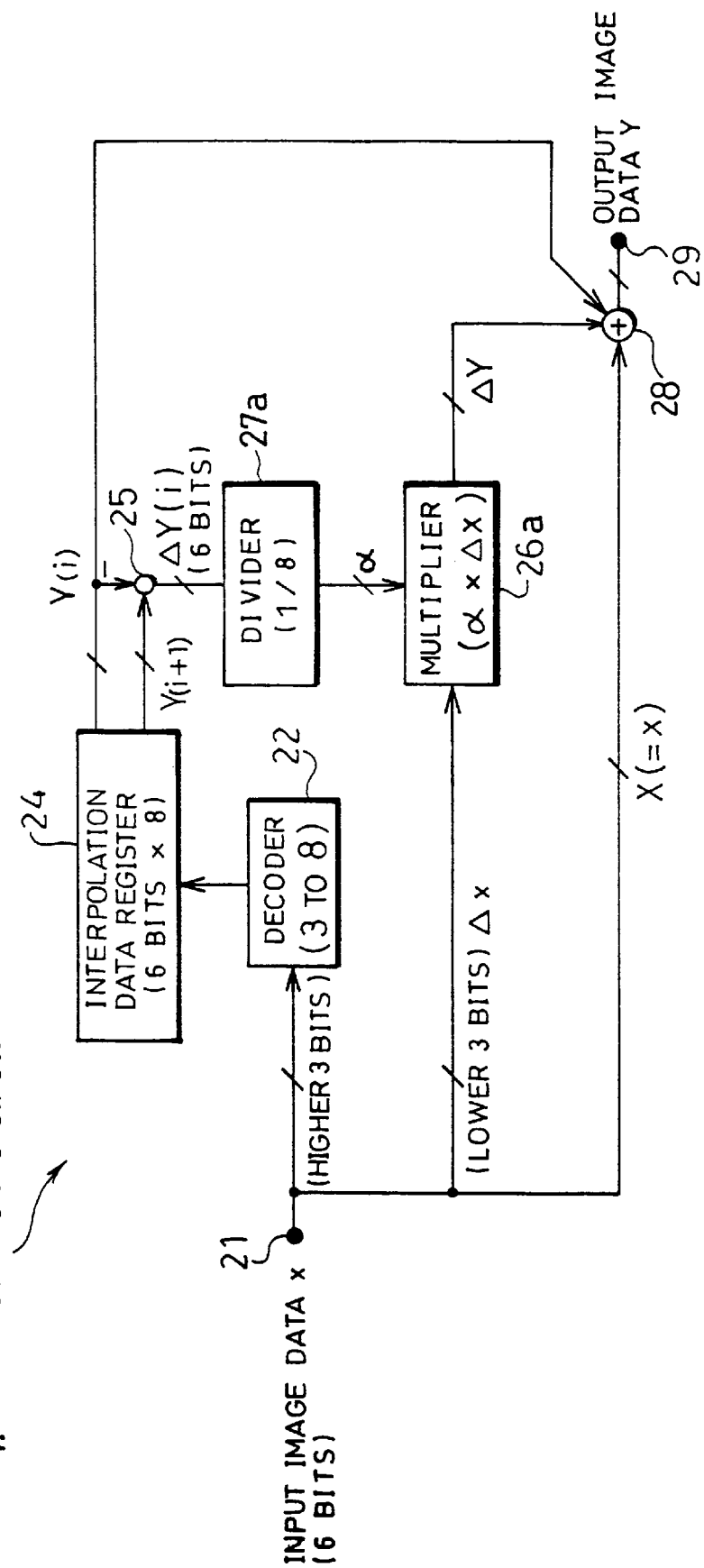
FIG. 6 is a block diagram depicting an example modification of the level correcting circuit.

In the present embodiment, the proportional component X is proportional to the input image data x at a coefficient 1. However, if the proportional component X is proportional to the input image data x at a coefficient other than 1, a coefficient device may be provided between the input terminal 21 and adder 28. The level correcting circuit 1 carries out the division using the interval Δxu after the multiplication of the balance ΔY(i) and distance Δx to improve the calculation accuracy. However, as shown in equations (3) and (4), the balance ΔY(i) may be divided by the interval Δxu, and the result may be multiplied by the distance Δx after the gradient α is computed. In this case, as shown in FIG. 6, for example, a multiplier 26a is provided in the succeeding stage of a divider 27a.

In the level correcting circuit 1 arranged in the above manner, the data the interpolation data register 24 has to store is only the balance from the proportional component X used as the reference at the start ends x(i), x(i+1), . . . of the interpolation areas. Thus, a volume of the stored data is very small. Although the number of the transistors increases by incorporating the subtractor 25, multiplier 26, divider 27, adder 28, etc., the number of the overall transistors can be reduced by half or less compared with the prior art when correcting the image data with 6-bit accuracy. If the number of levels increases further, the downsizing effect becomes more apparent. Thus, according to the above arrangement, the number of the levels can be increased while the circuit size remains substantially the same.

In the image data level correcting method of the present embodiment, the output image data are generated based on the offset component at the start end of each interpolation area alone. However, alternatively, the output image data may be generated based on the offset component for each piece of input image data to obtain similar effects, which will be described in the following.

To be more specific, the above image data level correcting method includes the three following steps:

- a storing step of computing and storing the offset components from the proportional component which is linearly proportional to the input image data, for example, at a ratio of 1:1, in advance;
- an offset obtaining step of obtaining a first offset component corresponding to the input image data out of the offset components stored in the above step; and
- a computing step of computing the output image data by adding the first offset component and the proportional component of the input image data.

In the case of the image data level correction, a domain of values of the offset components with respect to a domain of variability of the input image data is narrow compared with a domain of values of the output image data per se. Thus, storing the offset components in the storing step can reduce a memory capacity necessary for the data used in correction compared with a case of storing the output image data per se. Consequently, it has become possible to increase the number of levels of the input and output image data while maintaining the size of a circuit, such as a memory.

The interpolation data register 24 of the present embodiment assigns the bit width as wide as the input image data to each register. However, the bit width of each register can be smaller than the bit width of the input image data as long as the offset component can be stored therein. Accordingly, a memory capacity of the interpolation data register 24 can be reduced particularly when the bit width of the input image data is large.

To be more specific, in the γ correction, the output image data Y are generally expressed by Equation (8) below using a γ coefficient:

$$Y = x^\gamma \quad (8)$$

where x represents the input image data. A typical value of the γ coefficient is γ=0.45 for CRT, and γ=0.65–0.8 for a facsimile machine.

Given that γ=0.45 and γ=0.7, then the output image data Y and offset component computed in accordance with Equation (8) above are set forth in table 3 below and FIG. 7.

TABLE 3

| INPUT IMAGE DATA | γ = 0.45 | | γ = 0.7 | |
|---|---|---|---|---|
| | OUTPUT IMAGE | OFFSET COMPONENT | OUTPUT IMAGE | OFFSET COMPONENT |
| 0 | 0 | 0 | 0 | 0 |
| 0.1 | 0.355 | 0.255 | 0.200 | 0.100 |
| 0.2 | 0.485 | 0.285 | 0.324 | 0.124 |
| 0.3 | 0.582 | 0.282 | 0.431 | 0.131 |
| 0.4 | 0.662 | 0.262 | 0.527 | 0.127 |
| 0.5 | 0.732 | 0.232 | 0.616 | 0.116 |
| 0.6 | 0.795 | 0.195 | 0.699 | 0.099 |
| 0.7 | 0.852 | 0.152 | 0.779 | 0.079 |
| 0.8 | 0.904 | 0.104 | 0.855 | 0.055 |
| 0.9 | 0.954 | 0.054 | 0.929 | 0.029 |
| 1 | 1 | 0 | 1 | 0 |

Figure 7:
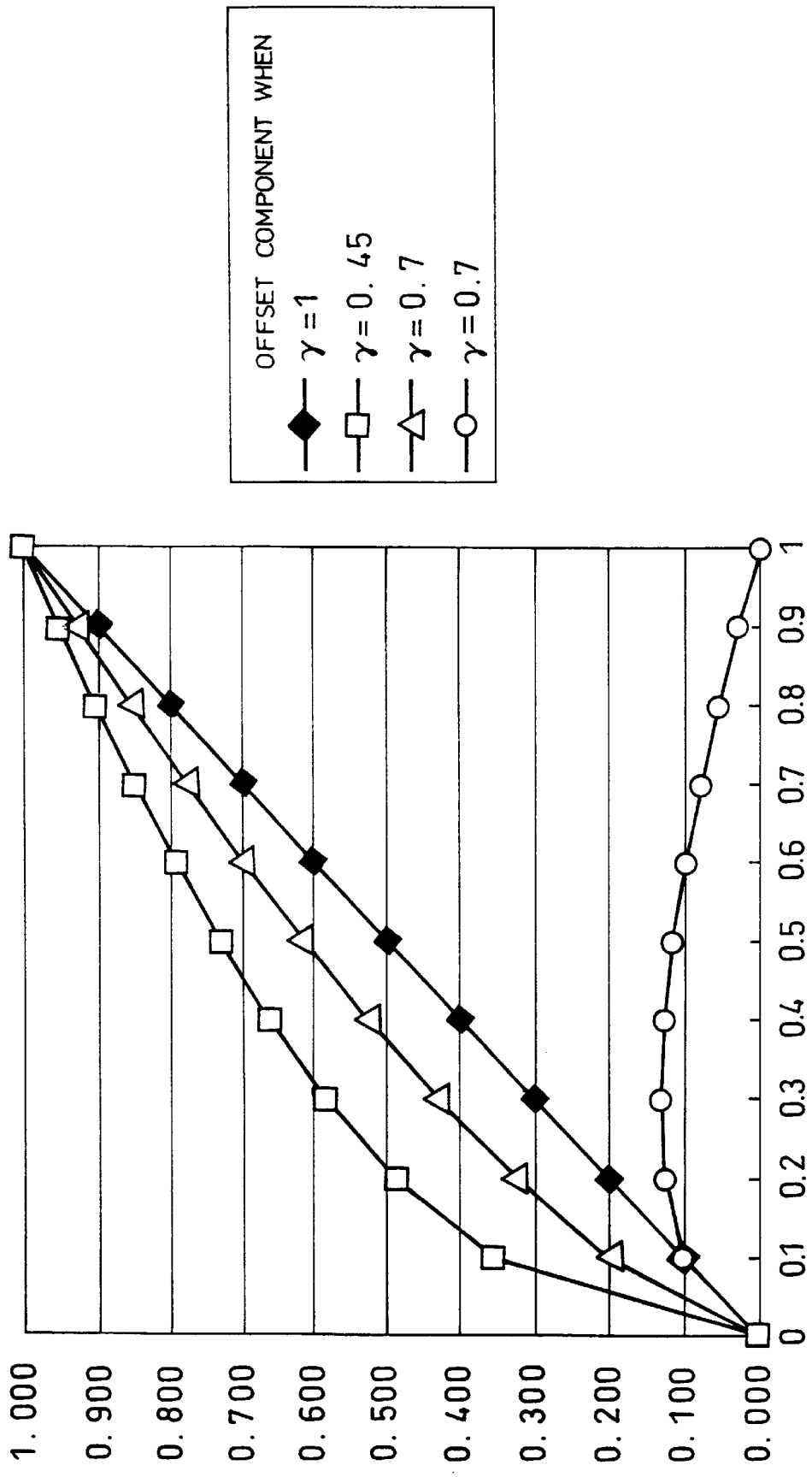
FIG. 7 is a graph explaining a relationship of input data and output data of the level correcting circuit.
Figure 8:
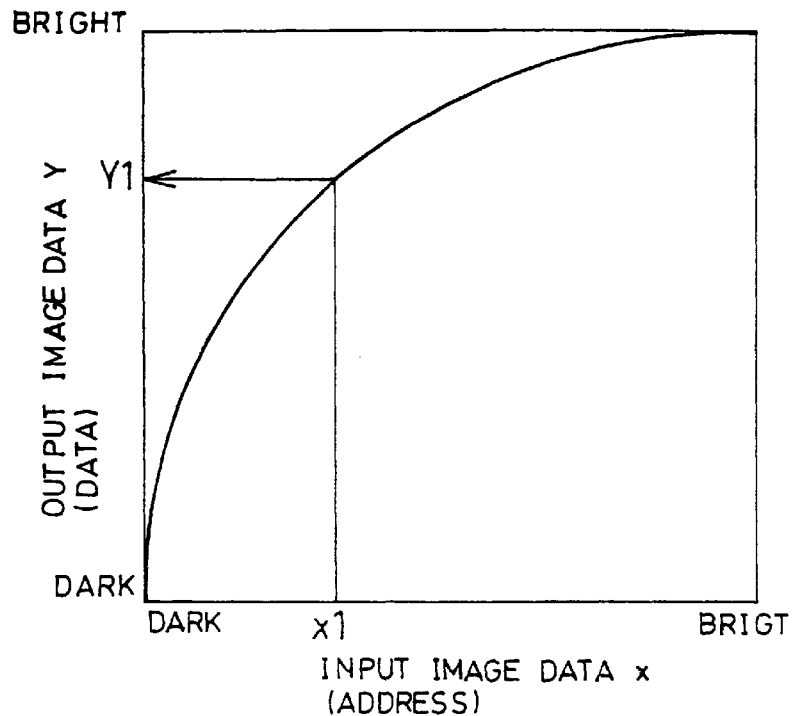
FIG. 8 is a graph explaining a relationship of input and output data in level correction.
Figure 9:
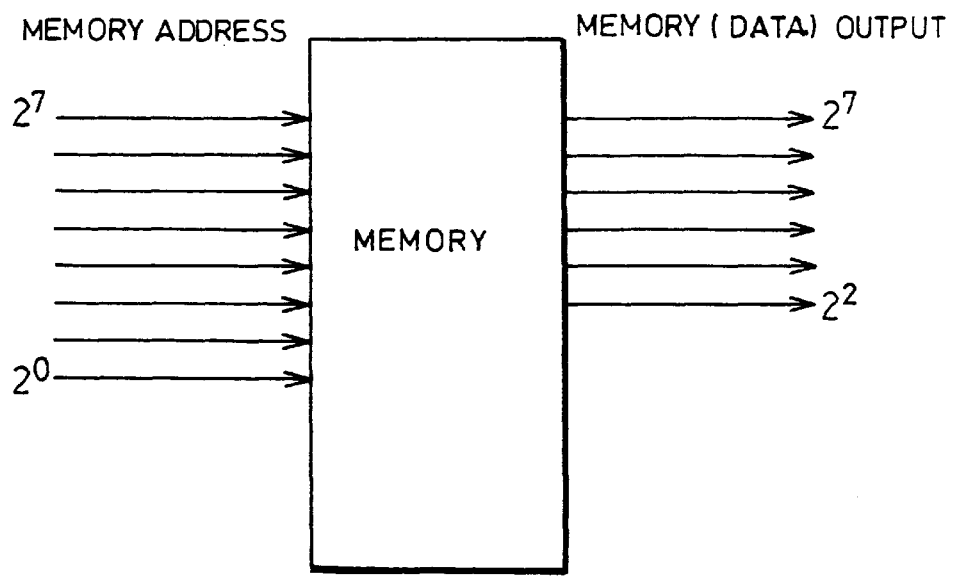
FIG. 9 is a view depicting an example arrangement to realize the level correction of FIG. 8.

As is apparent from Equation (8) and Table 3 above, and FIG. 7, the maximum of the offset component is smaller than the maximum of the out image data Y. Thus, an area necessary to store the offset component is far smaller than an area necessary to store the output image data.

As a good example showing the memory capacity reduction effect, given γ=0.7, then the maximum of the offset component is approximately 0.131. When the output image data Y are represented by the 6-bit accuracy, a unit length is $\frac{1}{2}^6$ and the maximum of the offset component is 8.3. Consequently, the offset component can be stored in a 3-bit storage area, which is an area half the storage area (6 bits) necessary to store the output image data Y intact. Thus, setting γ=0.7 can reduce the memory capacity significantly, and at the same time, the same can realize a level correcting apparatus suitably used for the γ correction of an image to be transmitted by a facsimile machine.

To further reduce the memory capacity, it is preferable to carry out the above steps in the manner described below. That is, in the storing step, the data area of the input image data are divided into a plurality of interpolation areas, and the offset component at the start end of each interpolation area is stored in advance. In the offset component obtaining step, a second offset component at the start end of a first interpolation area, to which the input image data belong, and a third offset component at the start end of the next adjacent interpolation area are retrieved from the offset components stored in the storing step. In the computing step, the first offset component (Y0) is computed in accordance with:

$$Y0 = (\Delta Y/N \times \Delta x) + Y(i)$$

where N is a width across the first interpolation area, ΔY is a balance between the second and third offset components, Δx is a distance from the start end of the first interpolation area to the input image data, and Y(i) is the second offset component.

According to the above arrangement, the first offset component Y0 corresponding to the input image data is computed out of the second and third offset components. Thus, it is no longer necessary to store the offset component for each piece of input image data, and the output image can be computed by storing the offset component at the start end of each interpolation area alone. Consequently, the memory capacity required in the storing step can be reduced further. Thus, it has become possible to increase the number of levels in the input and output image data while maintaining the circuit size.

To realize an apparatus of correcting the image data levels carrying out each of the above steps, it is preferable to compute ΔY×Δx first when computing Y0, for example, Y0=(ΔY×Δx)/N, to reduce a rounding error.

In the present embodiment, although the number of interpolation areas is set to $2^n$ (n is a natural number), and each interpolation area has the same width, the number and width of the interpolation areas can be set to any value. However, setting the number of the interpolation areas to $2^n$ and the width of each equal is advantageous, because the decoder 22 can judge the interpolation area, to which the input image data belong, from a combination of the higher bits of the input image data x. Thus, the decoder 22 does not have to be a complicated circuit like a dividing circuit, but can be a simple circuit like a logical circuit. Further, in this case, the multiplier 26 and divider 27 can be composed of a bit shift circuit and an adding circuit, respectively. For this reason, a circuit arrangement of the entire level correcting apparatus can be simplified.

Also, in the present embodiment, the operation circuits for computing the output image data, such as the multiplier 26, divider 27, and adder 28, are the circuits, such as hard-wired logic, in which the operating method is predetermined according to the circuit arrangement. However, other kinds of circuits are also applicable. The above operation circuits can be realized by a circuit, with which the operation method can be set by a software program, such as a CPU (Central Processing Unit). In this case, although the operation becomes complicated, the circuit size remains the same. Thus, the circuit size of the image data level correcting apparatus can be downsized in a secure manner because the memory capacity of the interpolation data register 24 is reduced.

Note that, however, it is preferable to realize the above operation circuits by the hard-wired logic or the like, because a high-speed circuit is required to process the image data. In this case, the number of the gates increases as the operation becomes complicated, and the circuit size of the operation circuits increases as well. Thus, even if the memory capacity can be reduced, the circuit size of the entire image data level correcting apparatus possibly increases. However, the operations carried out in the image data level correcting method of the present invention are those which can be carried out by a relatively small circuit, such as addition, multiplication and division. Thus, since the circuit downsizing effect due to the memory capacity reduction is greater than the circuit upsizing drawback due to the operation circuits, the circuit size of the entire image data level correcting apparatus can still be downsized. The above effect is particularly obvious in case that the input image data have a great number of bits, that is, when the number of levels increases, because the memory capacity can be reduced significantly.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for correcting image data levels and for generating output image data by effecting predetermined level correction to input image data, comprising:

a storing step of computing and storing offset components from a proportional component, said proportional component being linearly proportional to said input image data;

an offset component obtaining step of computing a first offset component, corresponding to said input image data, from the offset components stored in said storing step; and a computing step of computing said output image data by adding said first offset component and said proportional component of said input image data, wherein, said storing step includes the sub-step of dividing a data area of said input image data into more than one interpolation area to compute and store the offset component at a start end of said interpolation area in advance, and said offset component obtaining step includes the sub-steps of, retrieving a second offset component at the start end of first interpolation area, to which said input image data belong, and a third offset component at the start end of a next adjacent interpolation area out of the offset components stored in said storing step, computing a gradient of an approximate straight line to a variation of the offset component in said first interpolation area based on said second and third offset components, computing a variation of the offset component between the start end of said first interpolation area and said input image data based on a distance from the start end of said first interpolation area to said input image data and said gradiant, and computing said first offset component by adding said variation of the offset component and said second offset component.

2. The method of correcting image data levels of claim 1, wherein a proportional constant of said proportional component is 1.

3. A method for correcting image data levels and for generating output image data by effecting predetermined level correction to input image data, comprising:

a storing step of computing and storing offset components from a proportional component, said proportional component being linearly proportional to said input image data;

an offset component obtaining step of computing a first offset component, corresponding to said input image data, from the offset components stored in said storing step; and a computing step of computing said output image data by adding said first offset component and said proportional component of said input image data, wherein, said storing step includes the sub-step of dividing a data area of said input image data into more than one interpolation area to compute and store the offset component at a start end of said each interpolation area in advance; and said offset component obtaining step includes the sub-steps of, retrieving a second offset component at the start end of a first interpolation area, to which said input image data belong, and a third offset component at the start end of a next adjacent interpolation area out of the offset components stored in said storing step, and computing said first offset component in accordance with a following equation:

$$Y0=(\Delta Y/N \times \Delta x)+Y(i)$$

where Y0 is said first offset component, N is a width across said first interpolation area, ΔY is a balance between said second and third offset components, Δx is a distance from the start end of said first interpolation area to said input image data, and Y(i) is said second offset component.

4. The method of correcting image data levels of claim 3, wherein a proportional constant of said proportional component is 1.

5. An apparatus for correcting image data levels and for generating output image data by effecting predetermined level correction to input image data, comprising:

an interpolation data register for storing offset components of said output image data corresponding to said input image data, based on a proportional component which is linearly proportional to said input image data;

offset component obtaining means for computing a first offset component, corresponding to said input image data, based on the offset components stored in said interpolation data register; and an adder for generating said output image data by adding the proportional component of said input image data and said first offset component, wherein, said interpolation data register stores the offset component at a start end of each of interpolation areas obtained by dividing a data area of said input image data; and said offset component obtaining means includes, a first decoder for retrieving a second offset component at the start end of a first interpolation area, to which said input image data belong, and a third offset component at the start end of a next adjacent interpolation area from said interpolation data register, a subtractor for computing a balance between said second and third offset components outputted from said interpolation data register, and a computing section of computing said first offset component in accordance with a following equation:

$$Y0 = (\Delta Y/N \times \Delta x) + Y(i)$$

where Y0 is said first offset component, N is a width across said first interpolation area, ΔY is an output from said subtractor, Δx is a distance from the start end of said first interpolation area to said input image data, and Y(i) is said second offset component.

6. The apparatus of correcting the image data level of claim 5, wherein,
said computing section includes a multiplier for multiplying the output from said subtractor by said distance Δx, and
a divider for dividing an output from said multiplier by said width N; and wherein
said adder adds said proportional component of said input image data, an output from said divider, and said second offset component Y(i).

7. The apparatus of correcting the image data level of claim 5, wherein,
said first decoder judges said first interpolation area based on relatively higher bits of said input image data;
said computing section receives a remainder of the bits of said input image data as said distance Δx.

8. The apparatus of correcting the image data level of claim 5, wherein a proportional coefficient of said proportional component is 1.

9. The apparatus of correcting the image data level of claim 5, wherein a bit length of the offset component stored in said interpolation data register is relatively shorter than a bit length of said input image data.

10. The apparatus of correcting the image data level of claim 5, wherein said interpolation data register stores the offset component for effecting γ correction to said input image data to be outputted.

11. The apparatus of correcting the image data level of claim 5, wherein said offset component obtaining means has a predetermined operation in accordance with a circuit arrangement thereof.

12. An apparatus for correcting image data levels and for generating output image data by effecting predetermined level correction to input image data, comprising:

an interpolation data register for storing offset components of said output image data corresponding to said input image data, based on a proportional component which is linearly proportional to said input image data;

offset component obtaining means for computing a first offset component, corresponding to said input image data, based on the offset components stored in said interpolation data register; and an adder for generating said output image data by adding the proportional component of said input image data and said first offset component, wherein, said interpolation data register stores the offset component at a start end of each of interpolation areas obtained by dividing a data area of said input image data;

said offset component obtaining means includes, a first decoder for retrieving a second offset component at the start end of a first interpolation area, to which said input image data belong, and a third offset component at the start end of a next adjacent interpolation area for said interpolation data register, a subtractor for computing a balance between said second and third offset components outputted from said interpolation data register, a divider for dividing said balance by a distance across said first interpolation area and computing a gradient of an approximate straight line to a variation of the offset component in said first interpolation area, and a multiplier for multiplying a distance from the start end of said first interpolation area to said input image data by said gradient to compute a variation of the offset component between the start end of said first interpolation area and said input data image; and said adder adds the proportional component of said input image data, said variation of the offset component, and said second offset component.

13. The apparatus of correcting the image data level of claim 12, wherein a proportional coefficient of said proportional component is 1.

14. The apparatus of correcting the image data level of claim 12, wherein a bit length of the offset component stored in said interpolation data register is relatively shorter than a bit length of said input image data.

15. The apparatus of correcting the image data level of claim 12, wherein said interpolation data register stores the offset component for effecting γ correcting to said input image data to be outputted.

16. The apparatus of correcting the image data level of claim 12, wherein said offset component obtaining means has a predetermined operation in accordance with a circuit arrangement thereof.

* * * * *